3,772,232
FLAME-RETARDANT POLYMERS
Ernest Frank Hayes, Liverpool, England, assignor to Monsanto Chemicals Limited, London, England
No Drawing. Filed June 26, 1972, Ser. No. 266,107
Claims priority, application Great Britain, June 30, 1971, 30,606/71
Int. Cl. C08f 45/30
U.S. Cl. 260—28.5 AV  3 Claims

ABSTRACT OF THE DISCLOSURE

Flame-retardant olefin polymers are prepared which contain a halogenated hydrocarbon wax and a tris(dihaloalkyl) phosphate. The flame-retardant olefin polymers retain necessary optical and compatibility properties and are useful in the preparation of film for packaging purposes.

---

This invention relates to flame-retardant polymers and particularly to flame-retardant olefin polymers.

The use of olefin polymers, such as polyethylene, polypropylene and ethylene/vinyl acetate copolymers, to produce packaging films is very widespread and is a result, to a certain extent, of the excellent optical properties of such films. It is found, however, that when attempts are made to produce a flame-retardant film grade of such a polymer, the product very often has inferior optical properties when compared with the non-flame-retardant grade. In addition those additives that produce only an acceptable adverse effect on the optical properties, frequently give rise to compatibility problems.

A flame-retardant formulation has now been found which, when incorporated in an olefin polymer, results in a film having excellent optical properties.

The invention comprises a flame-retardant olefin polymer composition comprising an olefin polymer containing from about 1 to about 20% by weight of the composition of a halogenated hydrocarbon wax and from about 0.05% to about 5% by weight of the composition of a tris(dihaloalkyl) phosphate.

The olefin, polymer can be a homopolymer such as ethylene or propylene, made by a high or low pressure process, or a copolymer such as one comprising up to 20% or perhaps as high as 30% by weight of a co-monomer that can be another olefin, a non-hydrocarbon such as a nitrile monomer, for example acrylonitrile, a vinyl halide such as vinyl chloride or vinylidene chloride, or an unsaturated ester such as ethyl acrylate or vinyl acetate.

In practice, very satisfactory results have been obtained by the incorporation of the flame-retardant formulation in a copolymer of ethylene with vinyl acetate and this forms a preferred composition of the invention.

The halogenated hydrocarbon wax can comprise any of the halogen atoms such as bromine, chlorine or fluorine or even mixtures of such atoms. The wax itself can comprise hydrocarbons having from about 5 to about 100 carbon atoms, such as from about 10 to about 25 carbon atoms. The best results are obtained when the number of halogen atoms in the molecule is at least 50% and preferably at least 80% of the number of carbon atoms in the molecule. Very often the halogenated wax comprises a mixture of compounds of differing formulas and the percentage of halogen atoms is then based on a weighted average of these formulas. The preferred halogenated hydrocarbon wax is a chlorinated hydrocarbon having from about 20 to about 25 carbon atoms, for example a wax comprising a mixture of chlorinated hydrocarbons and having an approximate average formula (i.e., with each element given to the nearest whole number), of $C_{23}H_{28}Cl_{20}$.

The halogenated hydrocarbon wax is present in an amount of from about 1 to about 20% by weight of the polymer composition, but particularly advantageous results are obtained with an amount that is from about 5 to about 15% and especially from about 5 to about 10% by weight of the composition.

The tris(dihaloalkyl) phosphate can also comprise any of the halogen atoms such as bromine, chlorine or fluorine. The alkyl group on which the halogen atoms are substituted is preferably one having from 2 to 4 carbon atoms such as ethyl, propyl or butyl, of which propyl is most convenient in practice. Excellent results have been obtained using tris(2,3-dibromopropyl) phosphate and this is the preferred phosphate for the purposes of this invention. Other tris(dihaloalkyl) phosphates which are useful include tris(2,3-dichloropropyl) phosphate, tris(1,2-dibromoethyl) phosphate, tris(1,2-dichloroethyl) phosphate, tris(1,2-dibromopropyl) phosphate, tris(2,3-difluoropropyl) phosphate, tris(1,2-dibromobutyl) phosphate, tris(2,3-dibromobutyl) phosphate, tris(3,4-dichlorobutyl) phosphate, tris(2,2-dibromopropyl) phosphate and similar compounds.

The weight of the tris(dihaloalkyl) phosphate in the composition is from about 0.05 to about 5% of the composition. Within this range a percentage of from about 0.5 to about 2.5% and particularly from about 1 to about 2% by weight has been found to give particularly satisfactory results.

The proportions relative to each of the wax and the phosphate are preferably from about 8:1 to about 12:1 by weight but relative proportions of from about 9:1 to about 11:1, such as about 10:1, are often found to be particularly useful.

The composition can comprise further additives such as antistatic agents, antioxidants, slip additives, antiblock agents, coloring matter and the like. It is, however, desirable that any further additive should not have the effect of impairing the optical properties of the polymer.

The flame-retardant or other additive that may be present can be incorporated into the polymer by any process through which a substantially homogeneous mixture of components is achieved. Banbury mixing, mill rolling or extrusion mixing are examples of suitable processes.

The polymer can be fabricated into articles having any desired shape but it is of greatest utility, as has already been indicated, in the production of films, that is to say thin sheets having a thickness of less than about, for instance 50 microns.

The invention is illustrated by the following examples.

EXAMPLE 1

This example describes a composition according to the invention comprising a copolymer of ethylene and vinyl acetate, and demonstrates its excellent flame-retardancy and optical properties.

An ethylene/vinyl acetate copolymer comprising 12% by weight of vinyl acetate was compounded with a chlorinated paraffin wax having the approximate formula $C_{23}H_{28}Cl_{20}$ and tris(2,3-dibromopropyl) phosphate so that, in the resulting composition, there was 10% by weight of wax and 1% by weight of the phosphate ester.

A film of thickness 40 microns was extrusion blown from this resin and a film was similarly made from a "control" copolymer in which there was no flame-retardant formulation. Both films were treated similarly as set out below.

A sheet of the film, 12 inches long and 5 inches wide, was folded over lengthwise four times in one inch wide folds. The folded film was clamped at one end so as to hang vertically. A flame was applied to the bottom of the film and held there for a period of 15 seconds, after which the flame was removed.

The film of the composition of the invention continued to burn after removal of the flame for approximately two seconds before the flame went out. When the same test was applied to the control, the film burned vigorously until the whole sample had been consumed.

The optical properties of both the film of the composition of the invention and the control film are given in Table 1.

TABLE 1

| Optical property | Control | Film of invention |
|---|---|---|
| Clarity (percent) | 39 | 41 |
| Gloss (percent) | 57 | 59 |
| Haze (percent) | 4 | 5.5 |

The above properties were determined as follows:

Clarity—using the method described by Miles and Thorton in an article in the January 1962 edition of "British Plastics."
Gloss—using a 45° glossmeter.
Haze—by the method described in ASTM D-1003 6 IT.

These results show that the composition of the invention can be made into a film that is flame-retardant but which nevertheless has excellent optical properties. Its clarity and gloss are better than those of the control while the increase in haze is so slight as not to be noticeably under conditions of normal use.

Similar results are attained when using tris(2,4-dichloropropyl) phosphate, tris(1,2-dichloroethyl) phosphate and tris(2,3-dibromobutyl) phosphate in place of tris(2,3-dibromopropyl) phosphate.

EXAMPLE 2

This example describes a polyethylene composition according to the invention, and demonstrates the improvement in optical properties in comparison with those of a polyethylene composition containing antimony oxide.

A polyethylene having a melt index of 2.4 grams per ten minutes and a density of 0.9235 gm. per cc. was compounded with a chlorinated paraffin wax currently commercially available as "Dechlorane plus 25" ("Dechlorane" is a trademark of Hooker Chemical Corporation) and tris(2,3-dibromopropyl) phosphate, so as to give percentages by weight of wax and phosphate of 10% and 1% of the composition, respectively.

A film 40 microns in thickness was blown from this composition and was compared for flame-retardancy with a similar film blown from the polyethylene alone using the test outlined in Example 1. The film of the composition according to the invention continued to burn for only 3 seconds after removal of the flame whereas a control polyethylene film was completely burned.

The flame-retardancy of the film of the composition of the invention was also assessed according to the ASTM D-635 method for thin sheets. The product was rated as non-burning/self-extinguishing.

The optical properties of the films were determined by the methods indicated in Example 1 and compared with those of a similar film comprising 5% by weight of antimony trioxide, and 5% by weight of "Dechlorane plus 25." A control polyethylene film without any additives was also tested in the same way. The results are given in Table 2 below.

TABLE 2

| Optical property | Flame-retardant film of invention | Antimony trioxide treated film | Control |
|---|---|---|---|
| Clarity (percent) | 23 | 1 | 47 |
| Gloss (percent) | 10 | 8 | 52 |
| Haze (percent) | 60 | 87 | 6 |

These results demonstrate that while the optical properties of the film made of the composition of the invention are not so good as those of the control film the deterioration is less thn that experienced with film made using conventional flame-retardant formulations. On the other hand, the control film would be useless for any application requiring a flame-retardant film, while the composition containing antimony oxide has very poor clarity.

Similar results are obtained using tris(1,2-dibromoethyl) phosphate, tris(3,4-dichlorobutyl) phosphate and tris(2,3-difluoropropyl) phosphate in place of tris(2,3-dibromopropyl) phosphate.

The embodiments of this invention in which an exclusive property or privilege is claimed are defined as follows:

1. A flame retardant film composition consisting essentially of (A) about 89 percent by weight of an olefin polymer which is an ethylene/vinyl acetate copolymer of 88 percent by weight ethylene and 12 percent by weight vinyl acetate, (B) about 10 percent by weight of a chlorinated hydrocarbon wax and (C) about 1 percent by weight of tris(2,3-dibromopropyl)phosphate.

2. Film of claim 1 wherein said wax has an approximate average formula of $C_{23}H_{28}Cl_{20}$, said film having an optical clarity of about 41 percent.

3. Film of claim 1 wherein said olefin polymer is polyethylene, said film having an optical clarity of about 23 percent.

References Cited

UNITED STATES PATENTS

| 3,403,118 | 9/1968 | Listner | 260—23 |
| 3,516,959 | 6/1970 | Jonas | 260—28.5 A |
| 3,669,923 | 6/1972 | Hintz | 260—41 C |

OTHER REFERENCES

Modern Plastic Encyclopedia for 1970 and 1971, vol. 47, No. 10A, October 1970, p. 854.

ALLAN LIEBERMAN, Primary Examiner

P. R. MICHL, Assistant Examiner

U.S. Cl. X.R.

260—28.5 A

PO-1050
(5/69)

UNITED STATES PATENT OFFICE
CERTIFICATE OF CORRECTION

Patent No. 3,772,232  Dated November 13, 1973

Inventor(s) Ernest Frank Hayes

It is certified that error appears in the above-identified patent and that said Letters Patent are hereby corrected as shown below:

Column 1, line 42, after the word "olefin" delete the comma (,).

Column 3, at the end of line 31, "tris(2,4-di-" should read -- tris(2,3-di- --.

Column 3, line 43, "currentily" should read -- currently --.

Signed and sealed this 12th day of November 1974.

(SEAL)
Attest:

McCOY M. GIBSON JR.  C. MARSHALL DANN
Attesting Officer  Commissioner of Patents